(12) United States Patent  (10) Patent No.: US 9,030,214 B2
Mei et al.  (45) Date of Patent: May 12, 2015

(54) PROXIMITY OR TOUCH SENSOR

(75) Inventors: Wangsheng Mei, Suzhou (CN); Paulo C. Knirsch, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 301 days.

(21) Appl. No.: 13/549,515

(22) Filed: Jul. 15, 2012

(65) Prior Publication Data

US 2013/0049768 A1   Feb. 28, 2013

(30) Foreign Application Priority Data

Aug. 26, 2011   (CN) .......................... 2011 1 0307017

(51) Int. Cl.
*G01R 27/04* (2006.01)
*G06F 3/044* (2006.01)

(52) U.S. Cl.
CPC ...................................... *G06F 3/044* (2013.01)

(58) Field of Classification Search
CPC ................................ G06F 3/044; G01R 27/04
USPC ................. 324/625–633, 600, 179, 200, 220, 324/234–247
See application file for complete search history.

(56) References Cited

U.S. PATENT DOCUMENTS

| | | | |
|---|---|---|---|
| 5,283,559 A | 2/1994 | Kalendra | |
| 5,986,224 A * | 11/1999 | Kent | 178/18.04 |
| 6,583,676 B2 | 6/2003 | Krah | |
| 7,719,367 B2 | 5/2010 | Krah | |
| 7,907,020 B2 | 3/2011 | Wilson | |
| 2002/0196066 A1 | 12/2002 | Krah | |
| 2005/0200635 A1* | 9/2005 | Silverbrook | 347/2 |
| 2008/0012832 A1* | 1/2008 | GuangHai | 345/173 |
| 2009/0027068 A1 | 1/2009 | Philipp | |
| 2010/0053097 A1 | 3/2010 | Goh | |
| 2010/0085325 A1* | 4/2010 | King-Smith et al. | 345/174 |

FOREIGN PATENT DOCUMENTS

WO    03/001672    1/2003

OTHER PUBLICATIONS

McComb, Marc. Introduction to mTouchTM, Capacitive Touch Sensing, Microchip WebSeminars, 2007. (http://techtrain.microchip.com/webseminars/ArchivedDetail.aspx?Active=149).

* cited by examiner

*Primary Examiner* — Melissa Koval
*Assistant Examiner* — Trung Nguyen
(74) *Attorney, Agent, or Firm* — Charles Bergere (57) ABSTRACT

A sensor for sensing proximity or touch of an object includes a sensing region, an oscillating signal generator for generating an oscillating signal having an oscillation period, a gating signal generator for generating a gating signal having a gating duration, a controller for controlling the oscillation period or the gating duration and a processor for determining a number N of oscillation periods over the gating duration. The number N is indicative of the object's contact with, or proximity to, the sensing region. The sensor is calibrated by determining an optimal value for the oscillation period or gating duration such that an optimal number N over the gating duration is expected.

15 Claims, 9 Drawing Sheets

PROXIMITY OR TOUCH SENSOR

BACKGROUND OF THE INVENTION

The present invention relates to a sensor for sensing proximity or touch of an object such as a finger and to a method of calibrating a proximity or touch sensor.

A proximity or touch sensor may function by detecting a change in capacitance of a sensing capacitor of the sensor due to contact or proximity of the object. The change in capacitance may in turn be detected by detecting a change in frequency of an oscillating signal generated by an oscillator circuit comprising that sensing capacitor. Such an oscillator circuit may, for example, include a resistive-capacitive (RC) oscillator circuit in which the oscillating frequency decreases with increasing capacitance of the sensing capacitor.

A multi-channel capacitive proximity or touch sensor may include multiple sensing capacitors spatially distributed on the sensor. To achieve simplicity and lower costs, a change in capacitance of each multiple sensing capacitor may be detected by the same processor. The processor may be sequentially coupled to each sensing capacitor for a short period of time to detect the touch or proximity. While it may lower costs, use of a single processor in a multi-channel sensor may require that each sensing capacitor has the same or similar static or parasitic capacitance (capacitance when untouched). Otherwise the different sensing capacitors may cause a large variation of oscillation frequencies, some of which may be too low or too high for the processor to accurately determine any relative change in oscillation frequency. For at least these reasons, a multi-channel sensor may have little flexibility in using sensing capacitors of different capacitance. This lack of flexibility means that the different sensing capacitors may not be sized or shaped differently or too differently. This lack of flexibility may also make it difficult to improve spatial resolution or accuracy of the multi-channel sensor.

BRIEF DESCRIPTION OF THE DRAWINGS

The following detailed description of preferred embodiments of the invention will be better understood when read in conjunction with the appended drawings. The present invention is illustrated by way of example and is not limited by the accompanying figures, in which like references indicate similar elements. It is to be understood that the drawings are not to scale and have been simplified for ease of understanding the invention.

DETAILED DESCRIPTION OF THE INVENTION

The capacitive proximity or touch sensor of the present invention may be configurable depending on static or parasitic capacitance of the sensing capacitor(s). Although the following description relates mostly to touch sensors, it will be understood by a skilled person that similar principles are applicable to proximity sensors.

According to a first aspect of the present invention there is provided a sensor for sensing proximity or touch of an object. The sensor includes a sensing region, an oscillating signal generator for generating an oscillating signal having an oscillation period, a gating signal generator for generating a gating signal having a gating duration, a controller for controlling the oscillation period and/or the gating duration, and a processing module for determining a number N of oscillation periods over the gating duration, the number N being indicative of the object's contact with, or proximity to, the sensing region.

According to a second aspect of the present invention there is provided a sensing assembly for sensing touch or proximity of an object. The sensing assembly includes a plurality of sensing regions, an oscillating signal generator for generating a series of oscillating signals, each oscillating signal having an oscillation period associated with a respective one sensing region, a gating signal generator for generating a series of gating signals, each gating signal having a gating duration associated with the respective one sensing region, a controller for controlling the oscillation period and/or the gating duration associated with each sensing region; and a processing module for determining, for each sensing region, a number N of oscillation periods over the gating duration associated with the respective one sensing region, the number N being indicative of the object's contact with, or proximity to, the respective one sensing region.

According to a third aspect of the present invention there is provided a method of calibrating a sensing assembly for sensing touch or proximity of an object, the sensing assembly comprising:
a plurality of sensing regions;
an oscillating signal generator for generating a series of oscillating signals, each oscillating signal having an oscillation period associated with a respective one sensing region;
a gating signal generator for generating a series of gating signals , each gating signal having a gating duration associated with the respective one sensing region;
a controller for controlling the gating duration associated with each sensing region; and
a processing module for determining, for each sensing region, a number N of oscillation periods over the gating duration associated with the respective one sensing region, the number N being indicative of the object's contact with, or proximity to, the respective one sensing region,
the calibrating method comprising the steps of, for each sensing region:
generating a test gating signal having a test gating duration;
obtaining a corresponding test number of oscillation periods over the test gating duration;
determining, based on the test gating duration and the corresponding test number of oscillating periods, a value indicative of an optimal value for the gating duration over which an optimal number of oscillating periods is expected; and storing the value indicative of the optimal value for the gating duration.

According to a fourth aspect of the present invention there is provided a method of calibrating a sensing assembly for sensing touch or proximity of an object, the sensing assembly comprising:

a plurality of sensing regions;

an oscillating signal generator for generating a series of oscillating signals, each oscillating signal having an oscillation period associated with a respective one sensing region;

a gating signal generator for generating a series of gating signals, each gating signal having a gating duration associated with the respective one sensing region;

a controller for controlling the oscillation period associated with each sensing region; and a processing module for determining, for each sensing region, a number N of oscillation periods over the gating duration associated with the respective one sensing region, the number N being indicative of the object's contact with, or proximity to, the respective one sensing region, the calibrating method comprising the steps of, for each sensing region:

generating a test oscillating signal having a test oscillation period;

obtaining a corresponding test number of oscillation periods over the gating duration;

determining, based on the test oscillation period and the corresponding test number of oscillating periods, a value indicative of an optimal value for the oscillation period such that an optimal number of oscillating periods over the gating duration is expected; and storing the value indicative of the optimal value for the oscillation period.

According to a fifth aspect of the present invention there is provided a method of sensing proximity or touch of an object by means of a sensor including a sensing region, the method comprising:

generating an oscillating signal having an oscillation period;

generating a gating signal having a gating duration;

controlling the oscillation period and/or the gating duration; and determining a number N of oscillation periods over the gating duration, the number N being indicative of the object's contact with, or proximity to, the sensing region.

Figure 1:
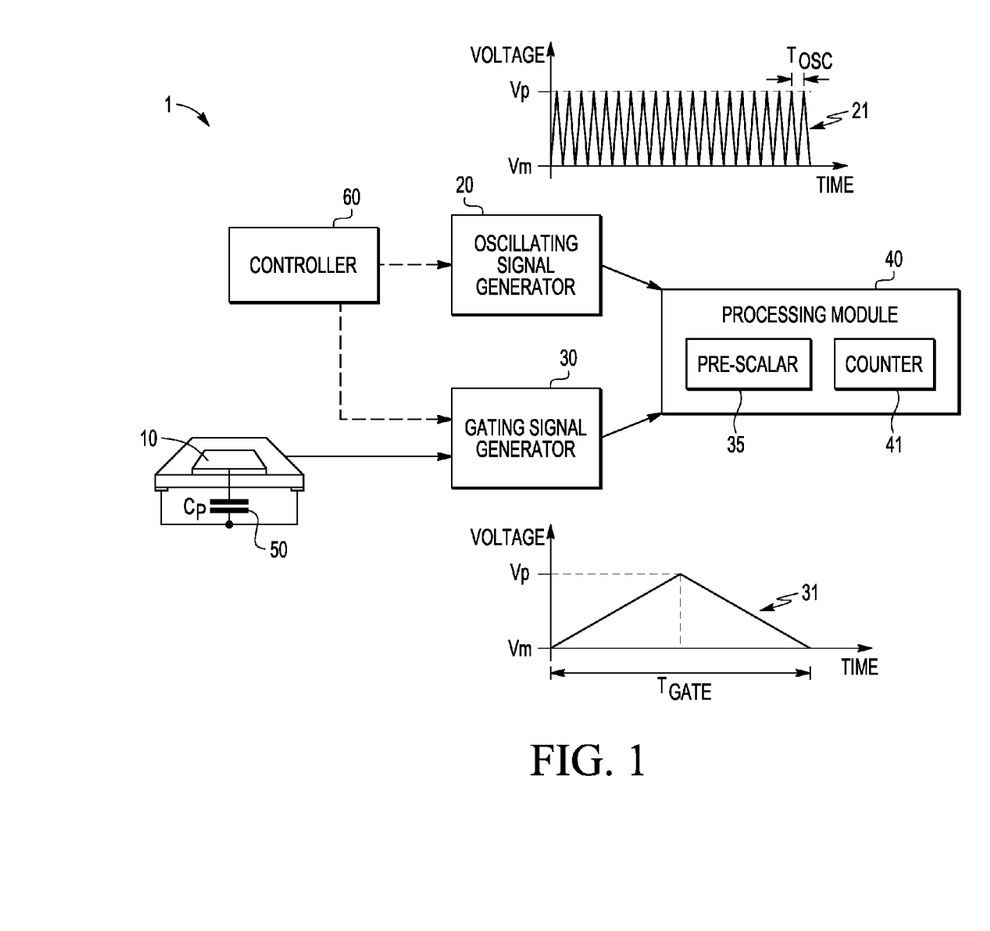
FIG. 1 is a schematic diagram of an embodiment of a sensor according to a first aspect of the present invention.

The invention may provide a single-channel sensor which has a single sensing region. The invention may also provide a multi-channel sensor or sensing assembly having a plurality of sensing regions, as discussed further below. Referring to FIG. 1, a sensor 1 has a sensing region 10 for sensing an object, such as a finger, an oscillating signal generator 20 for generating an oscillating signal 21 at an oscillation period $T_{OSC}$, a gating signal generator 30 for generating a gating signal 31 having a gating duration $T_{gate}$, and a processing module 40 for determining the number N of oscillation cycles or periods of the oscillating signal over the gating duration. The number N is therefore equal to, or at least approximately equal to, the ratio of $T_{gate}$ to $T_{OSC}$. The approximation may be a result of the discrete nature of N as opposed to the continuous nature of the ratio of $T_{gate}$ to $T_{OSC}$. As described below, the number N represents contact of the object with, or proximity to, the sensing region 10.

Figure 2:
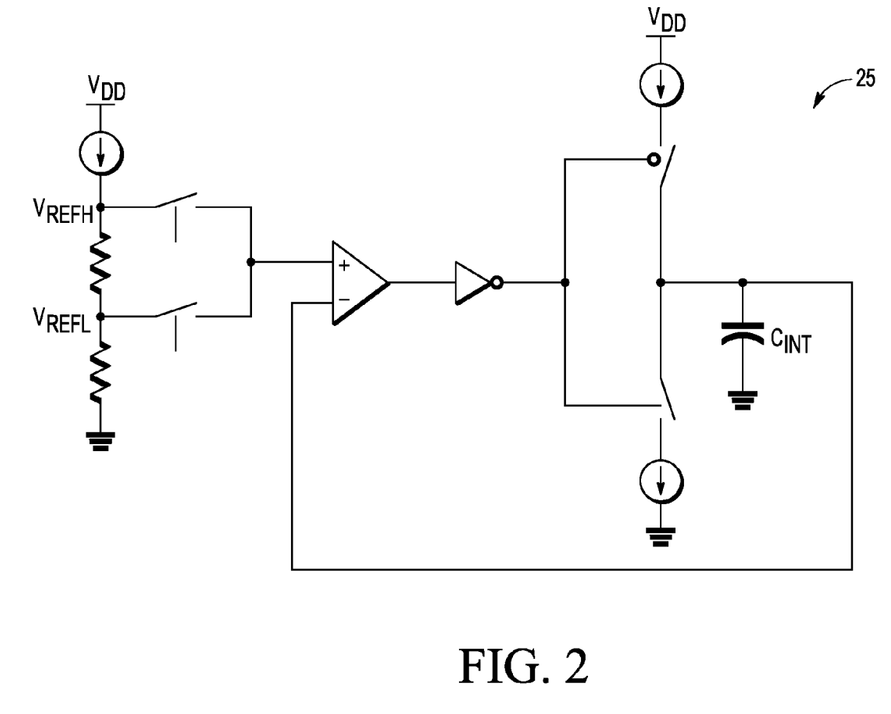
FIG. 2 is a schematic circuit diagram of an example of an oscillation circuit in accordance with an embodiment of the present invention.

In one embodiment, the oscillating signal generator 20 and the gating signal generator 30 may each include an oscillator circuit 25, as shown in FIG. 2, each having a respective internal capacitor $C_{int}$. The oscillatory signatures of the oscillating signal 21 and the gating signal 31 may range between a peak voltage $V_p$ and a minimum voltage $V_m$, over time and are characteristics of charging and/or discharging cycles of the respective internal capacitors $C_{int}$. The period of oscillator circuit 25 is proportional to the capacitance of the internal capacitor $C_{int}$ because a larger capacitor requires a longer time to charge to $V_p$ or discharge to $V_m$. The triangular or zig-zag shape of plots of voltage over time shown in the figures is exemplary only. Depending on actual configuration of oscillator circuit 25, signals 21 and 31 may exhibit other oscillatory signatures such as a square wave, which may be a preferred waveform in digital electronics.

Referring to FIG. 1, the sensing region 10 may be operatively coupled to a sensing capacitor 50 having static or parasitic capacitance $C_p$. Sensing capacitor 50 may in turn be operatively coupled to (e.g. connected in parallel with) the gating signal generator 30 or the oscillating signal generator 20 and may therefore form part of the oscillator circuit of either signal generator. The capacitance $C_p$ of sensing capacitor 50 is changeable by proximity or touch of an object, such as a finger, to the sensing region 10. FIG. 1 illustrates a first embodiment wherein sensing capacitor 50 is operatively coupled to gating signal generator 30. In this embodiment, sensing capacitor 50 having capacitance $C_p$ may be connected in parallel with the internal capacitor $C_{int}$ of the gating signal generator 30, resulting in an effective capacitance $C_p+C_{int}$ and a gating duration $T_{gate}$ that is proportional to $C_p+C_{int}$. Accordingly, any change in capacitance $C_p$ of sensing capacitor 50, arising for example from sensing region 10 being touched, can cause a change in $T_{gate}$. Similarly, in a second embodiment (not shown), the sensing capacitor 50 may be connected in parallel with the internal capacitor of the oscillating signal generator 20, in which case any change in capacitance of the sensing capacitor 50 can cause a change in $T_{OSC}$. In either embodiment, a change in the capacitance of the sensing capacitor 50 can cause a change in the number N being at least the ratio of $T_{gate}$ to $T_{OSC}$. In practice, the output signal from gating signal generator 30 may be conditioned by a pre-scalar 35. A pre-scalar essentially reduces the frequency of a signal by an integer factor M and therefore increases its period by the same factor. Typical values of M include powers of 2 such as 2, 4, 8, 16 and 32. In this case, pre-scalar 35 effectively increases $T_{gate}$ by a factor of M and therefore increases number N. Any reference to a gating signal or a gating duration in this specification is understood to mean a gating signal or a gating duration conditioned by the pre-scalar 35.

The processing module 40 may include a digital counter 41 for counting the number N and a microprocessor for determining whether there is any change in N to detect a touch on the sensing region 10. Counter 41 may include an input terminal for receiving the oscillating signal 21 and an output terminal whose output may increment by 1 for every voltage transition from $V_p$ to $V_m$ detected at the input terminal. Counter 41 may also include a reset terminal configured to receive the gating signal 30. The counter may be configured at the reset terminal to reset the counter output to zero upon receiving a voltage transition from $V_p$ to $V_m$. The counter output may therefore periodically count from zero until counter 41 is reset. The processor may monitor the counter output at regular intervals of $T_{gate}$, for example, just prior to counter 41 being reset.

Typically $T_{gate}$ (taking into account the multiplication by the integer factor M of pre-scalar 35) may be one to four orders of magnitude large than $T_{OSC}$ so that there may be 10 to 10000 oscillation cycles or periods over the gating duration $T_{gate}$. For example, the oscillating signal may have an oscillation period $T_{OSC}$ of 0.1 μs and the gating duration $T_{gate}$ may be 100 μs. The counter may therefore count 1000 oscillation cycles or periods of the oscillating signal 21 over the gating duration $T_{gate}$ and the processing module may determine the number N=1000. The processing module 40 may store 1000 counts as a "reference" number ($N_{ref}$) to indicate that the sensing region is not being touched. When an object such as a person's finger contacts the sensing region 10, the capacitance of the sensing capacitor is typically increased. The change in the capacitance will in turn affect $T_{OSC}$ or $T_{gate}$ depending on whether the sensing capacitor 50 is operatively coupled to (i.e. connected in parallel with) the oscillating signal generator 20 or the gating signal generator 30 and hence the number N. In the first embodiment, where sensing capacitor 50 is connected in parallel with the gating signal generator, $T_{gate}$ may increase by 25% from 100 μs to 125 μs when sensing capacitor 50 is touched. The number N may therefore increase by approximately 250 counts to approximately 1250 counts. In the second embodiment where sensing capacitor 50 is connected in parallel with the oscillating signal generator 20, $T_{OSC}$ may increase by 25% from 0.1 μs to 0.125 μs when sensing capacitor 50 is touched. The number N may therefore decrease by approximately 250 counts to approximately to 750 counts. Based on this change in the number N (i.e. the difference between N and $N_{ref}$), the processor of the processing module 40 may determine that the sensing region 10 is being touched. In practice, the first embodiment may be a more preferred embodiment than the second embodiment, since sensing at a lower frequency associated with the gating signal generator may result in better electromagnetic compatibility (EMC) performance as compared with a higher frequency associated with the oscillating signal generator. Furthermore, since the capacitance of the sensing capacitor 50 is typically of a comparable magnitude to the capacitance increased by touch, the frequency of the oscillating signal generator in the second embodiment is likely to be limited to a maximum value (e.g. approximately 1 MHz), thereby restricting the minimum values of $T_{OSC}$ and $T_{gate}$ and limiting the minimum duration it takes to obtain a sensing measurement.

According to the first aspect of the present invention, the sensor 1 comprises a controller 60 for controlling $T_{gate}$ and/or $T_{OSC}$ independent of any effects from the sensing region 10 being touched, thereby adjusting $N_{ref}$ as desired. For example, if controller 60 increases $T_{gate}$ by a factor of 2 to 200 μs (or decreases $T_{OSC}$ by a factor of 2 to 0.05 V), $N_{ref}$ then becomes 2000 counts, and the number of counts upon the object's contact or proximity may change by approximately 500 counts.

More importantly, controller 60 may allow the sensor 1 to substantially maintain the number of counts N, i.e. substantially maintaining the ratio of $T_{gate}$ to $T_{OSC}$ at a predetermined value or a predetermined range of values. Firstly, the ratio of $T_{gate}$ to $T_{OSC}$ should be sufficiently large such that N or the relative change in this ratio due to the sensing region 10 being touched may be sufficiently large for the processing module 40 to detect a change or difference from the reference number of counts to determine a touch. For example, if the ratio of $T_{gate}$ to $T_{OSC}$ (without touch) is approximately 10, then a 25% change in this ratio brought about by touching the sensing region is only approximately 10×25%=2.5 counts, which may not be sufficiently large for the counter and/or the processor to accurately detect a change or a difference, especially when there may be errors of measurements. Conversely, if the ratio of $T_{gate}$ to $T_{OSC}$ is approximately 500, then a 25% change in this ratio brought about by touching the sensing region is approximately 125 counts, which should be sufficiently large for the counter to measure and for the processor to accurately detect a change in the number of counts. Secondly, the ratio of $T_{gate}$ to $T_{OSC}$, and more specifically the value of $T_{gate}$, should be sufficiently small such that it takes an appropriately short time to obtain the sensing measurement. For example, the duration of a person tapping on a touch sensor may be 0.1 second or less. The number of counts should therefore be obtained within a gating duration $T_{gate}$ much less than 0.1 second to ensure that person's tap occurs during the entire gating duration $T_{gate}$.

The ability of the controller 60 to adjust or substantially maintain the ratio of $T_{gate}$ to $T_{OSC}$ at a predetermined value may be particularly important in multi-channel capacitive touch or proximity sensors. Multi-channel sensors have multiple sensing regions, each having a corresponding sensing capacitor and possibly different shapes and sizes leading to different static or parasitic capacitance.

Throughout this specification, a "channel" refers to a sensing region and its corresponding sensing capacitors. As mentioned above, the period of an oscillator circuit is proportional to capacitance of the oscillator circuit. In prior touch or proximity sensors, differences in capacitance among different sensing capacitors may mean that each time a sensing region is "scanned", i.e. when its corresponding sensing capacitor is operatively coupled to the gating signal generator or oscillating signal generator and a sensing measurement is obtained by the processing module, the ratio of $T_{gate}$ to $T_{OSC}$ may differ greatly and may not remain at a predetermined value (or within a range of predetermined values) as explained above. Further, the more sensing regions, the more quickly each sensing region may need to be scanned in order for the multiple channels to share a single processing module 40, hence further restricting how large $T_{gate}$ associated with each sensing region may be.

Figure 3:
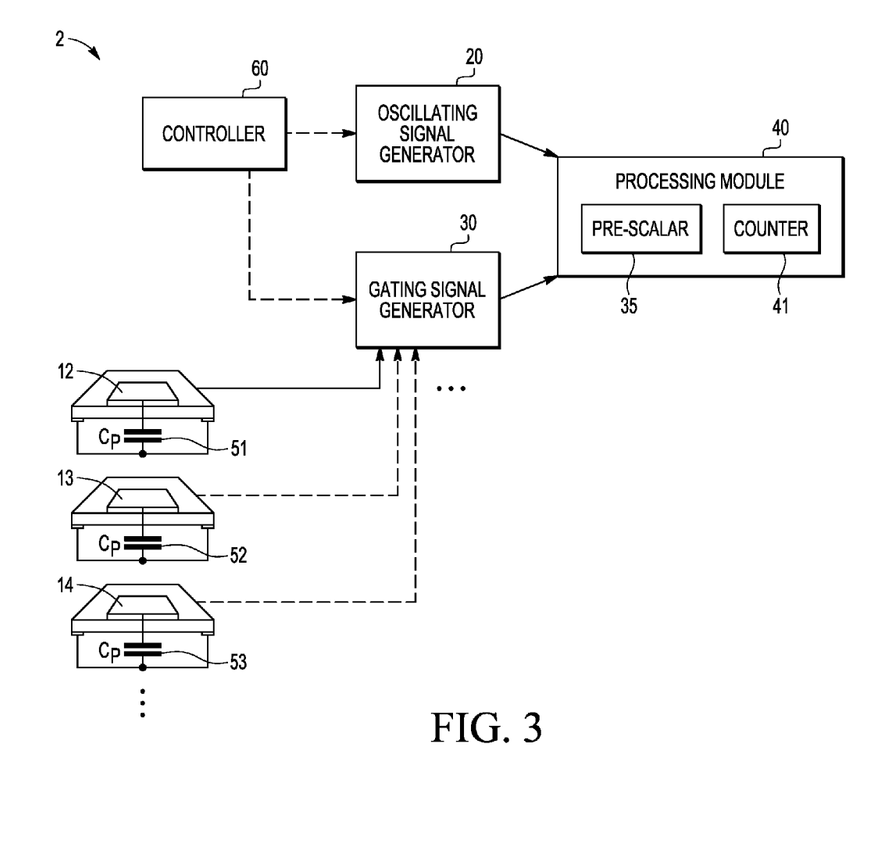
FIG. 3 is a schematic diagram of a first embodiment of a sensor according to a second aspect of the present invention.

Referring to FIG. 3, a second aspect of the present invention relates to a proximity or touch sensing assembly 2 comprising a plurality of sensing regions 12, 13, 14, an oscillating signal generator 20 for generating a series of oscillating signals 21, 22, 23, a gating signal generator 30 for generating a series of gating signals 31, 32, 33, a controller 60 for controlling the oscillation period or the gating duration associated with each of the plurality of sensing regions and a processing module 40 for determining, for each of the plurality of sensing regions, a number N. The multiple sensing regions 12, 13 and 14 may each be operatively coupled to its respective sensing capacitor 51, 52, 53.

The oscillating signal generator 20, the gating signal generator 30 and the processing module 40 may be time-multiplexed to each sensing region. For example, in the embodiment shown in FIG. 3, the gating signal generator 30 is operatively coupled to sensing regions 12, 13, 14 sequentially. Specifically, each sensing capacitor is sequentially connected in parallel with the internal capacitor of the gating signal generator 30 for a gating duration $T_{gate}$ associated with the particular sensing region.

Figure 4A:
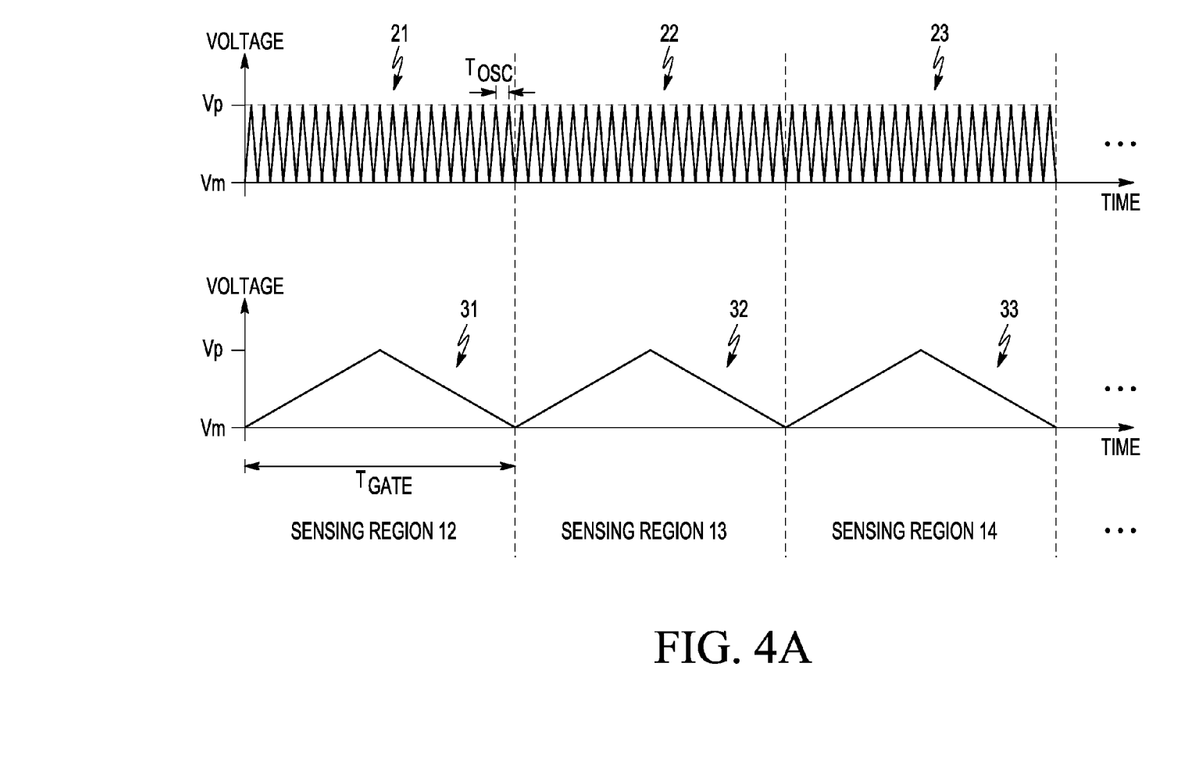
FIG. 4A is a signal timing diagram of the first embodiment of the sensor when the sensor is not being touched.

Referring to FIG. 4A, which illustrates a signal timing diagram of the embodiment in FIG. 3, the series of gating signals 31, 32, 33 are each associated with a respective sensing capacitor 51, 52, 53, and each has a gating duration associated with a respective sensing region 12, 13 and 14. In other words, the processing module 40 together with gating signal generator 30 may scan a channel, i.e. a sensing region with its corresponding sensing capacitor, for a short time determined by $T_{gate}$ associated with the particular channel to determine a change in capacitance in that particular channel, and then scan a next channel and so on. Once all channels are scanned, the scanning process may repeat for a second time and so on. Ideally all channels may be scanned at least once within the typical duration of a finger tap, say 0.1 s, so that processing module 40 can determine which sensing region or regions out of all sensing regions is or are being touched. For example, for a touch sensor with 250 sensing regions, an appropriately short duration for $T_{gate}$ of each sensing region may be 100 μs, such that each channel may be scanned every 25 ms (100 μs×250), which is well under the typical duration of the finger tap.

Figure 4B:
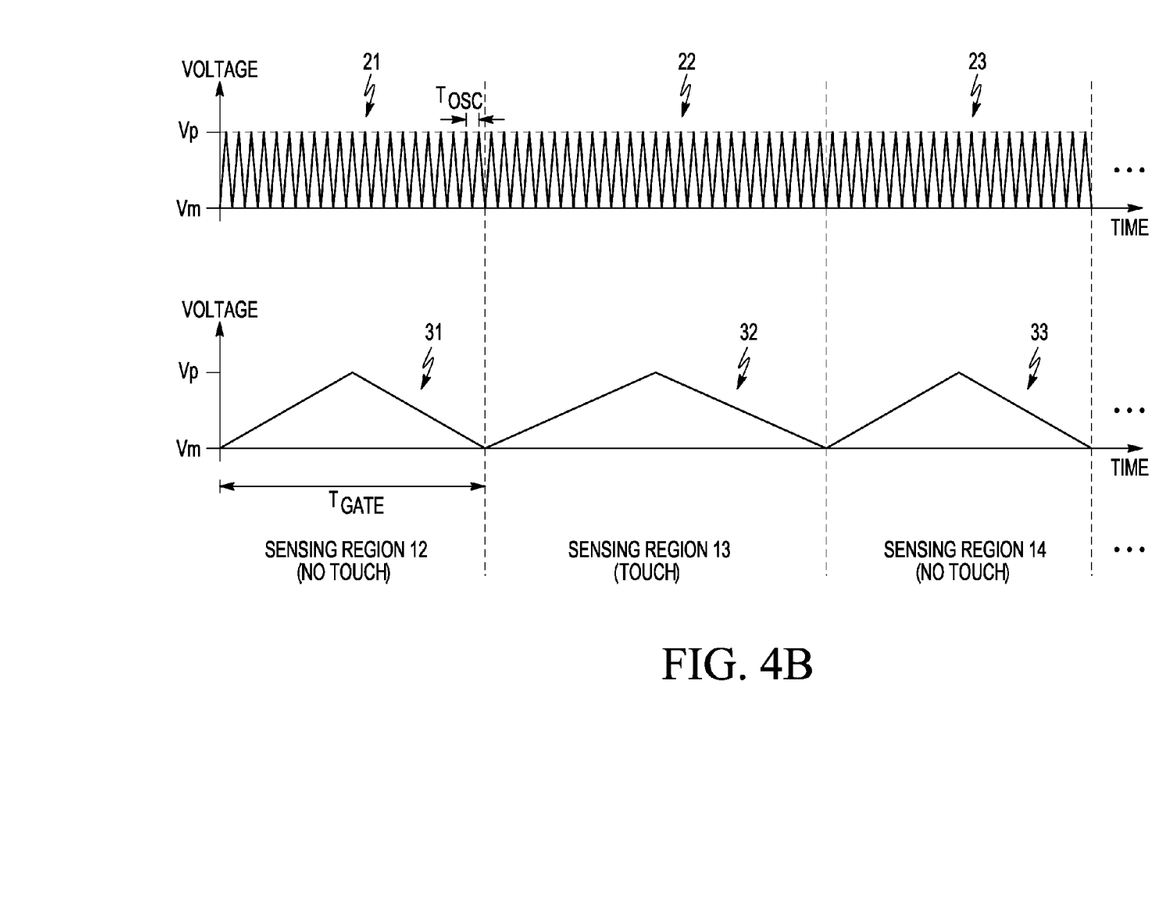
FIG. 4B is a signal timing diagram of the first embodiment of the sensor when the sensor is being touched.

FIG. 4B illustrates signal timing diagrams for this embodiment when sensing region 13 is touched. As illustrated, there is an increase in $T_{gate}$ 32 associated with the touched sensing region 13. During this particular gating duration, processing module 40 may determine that there is an increase in N from the reference number of counts $N_{ref}$, and therefore determines that sensing region 13 is being touched.

In a similar embodiment (not shown), oscillating signal generator 20 (and not gating signal generator 30) is operatively coupled to sensing regions 12, 13, 14 sequentially. Specifically each signal 21, 22, 23 is associated with a respective sensing capacitor 51, 52, 53, and each signal oscillates at a period associated with the respective sensing region 12, 13 and 14. Each sensing capacitor is sequentially connected in parallel with the internal capacitor of oscillating signal generator 20 for a gating duration $T_{gate}$ associated with the particular sensing region.

Figure 4C:
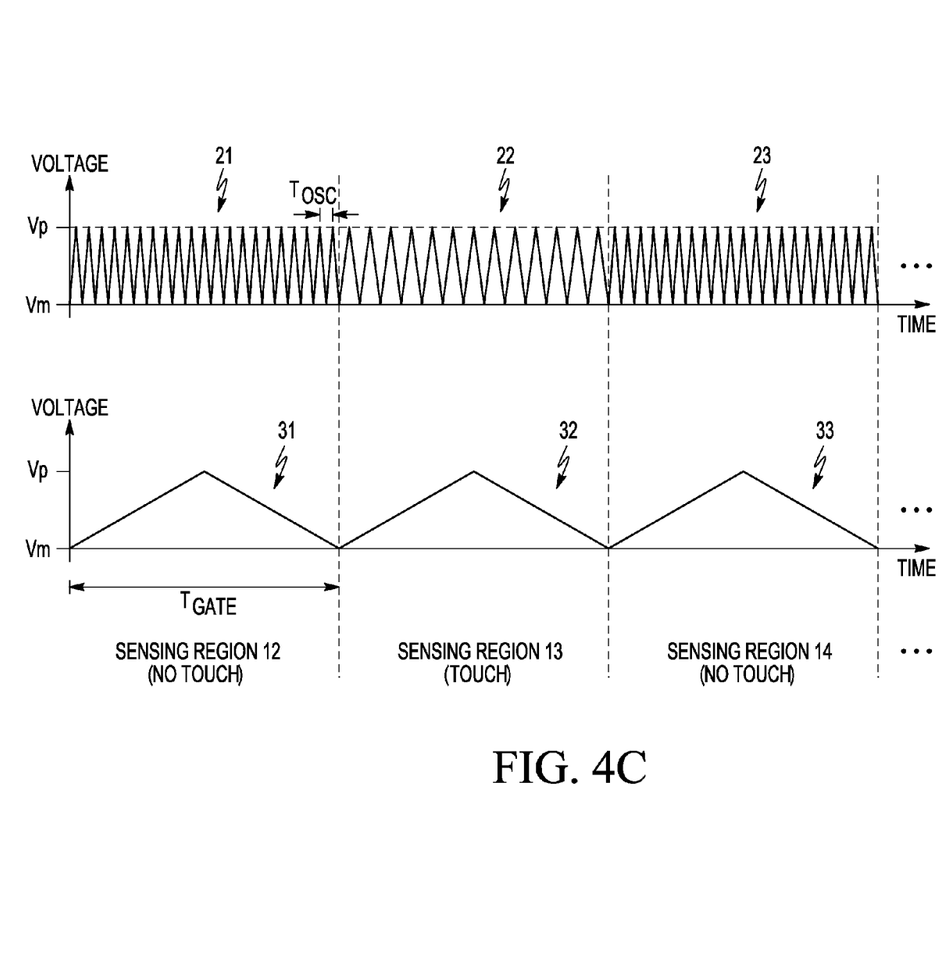
FIG. 4C is a signal timing diagram of a second embodiment of the sensor according to the second aspect of the invention when the sensor is touched.

FIG. 4C illustrates signal timing diagrams for this embodiment when sensing region 13 is touched. Specifically there is an increase in $T_{OSC}$ of 22 associated with the touched sensing region 13. Processing module 40 may determine that there is a decrease in the number of counts (that is, number of oscillation periods) from the reference number of counts, and therefore determines that sensing region 13 is being touched.

In what follows, the description will focus on embodiments wherein the sensing capacitors are operatively coupled to (e.g. connected sequentially in parallel with) gating signal generator 30. It will be understood by the skilled person that similar principles apply to embodiments wherein the sensing capacitors are operatively coupled to (e.g. connected sequentially in parallel with) oscillating signal generator 20.

Figure 5:
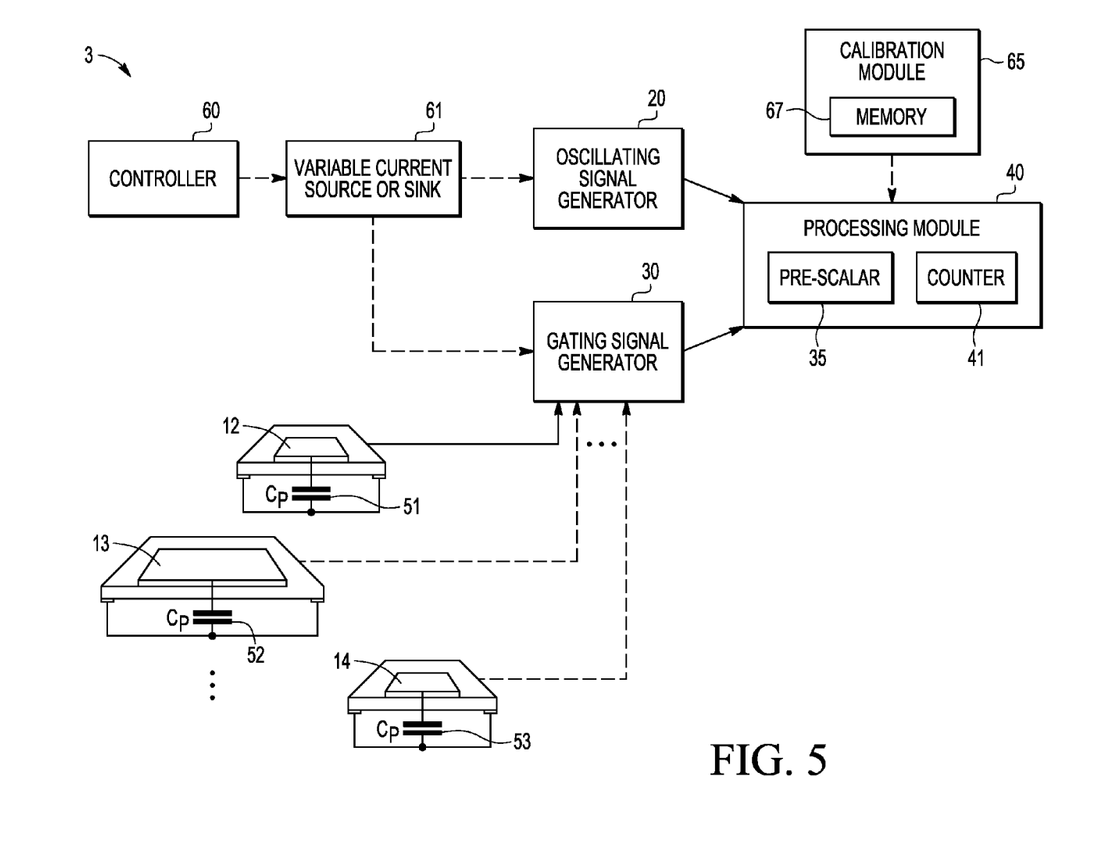
FIG. 5 is a schematic diagram of a third embodiment of the sensor according to the second aspect of the present invention.

In sensing assembly 3 illustrated in FIG. 5, the sensing regions 12, 13, 14 may have different shapes and sizes and sensing capacitors 51, 52, 53 may therefore have different capacitance. For example, the capacitance of sensing capacitors 51, 52, 53 may be 20 pF, 100 pF and 10 pF, respectively. In prior sensing assemblies, such a difference in capacitance means that, even when the sensing regions are not touched, there may exist a large variation in $T_{gate}$, since $T_{gate}$ is proportional to $C_{int}+C_p$. This large variation in $T_{gate}$ may in turn result in a large variation in the number of counts N. For example, the number of counts for sensing region 13 may be a factor of 10 larger than that for sensing region 14.

Figure 6:
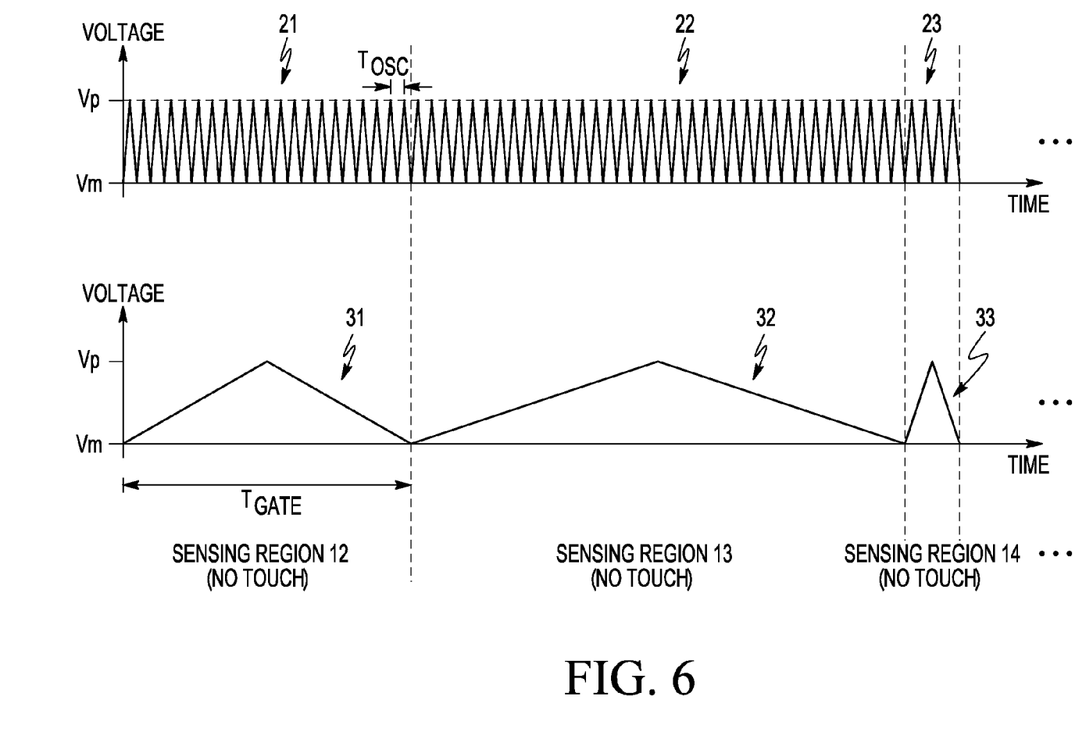
FIG. 6 is a signal timing diagram of the third embodiment of the sensor.

FIG. 6 illustrates signal timing diagrams with a large variation in $T_{gate}$ due to the difference in capacitance among different sensing capacitors where none of the sensing regions are being touched. A number of undesirable characteristics are shown in FIG. 6. As can been seen, sensing region 14, which is associated with a relatively small capacitor 53, is particularly problematic since during the short gating duration associated with sensing region 14, there may not be sufficient number of oscillation periods for processing module 40 to determine whether there is any change in the number of oscillating periods. Also, $T_{gate}$ associated with sensing region 13 may be unnecessarily long and may cause a slow down in scanning the multiple sensing regions in a time efficient manner.

To address these difficulties in multi-channel capacitive sensors, controller 60 in sensing assembly 2, 3 may control the gating duration $T_{gate}$ associated with each sensing region 12, 13, 14 and/or the oscillation period $T_{OSC}$ associated with each sensing region 12, 13, 14.

In one embodiment, controller 60 may control a variable current source or sink 61. Variable current source or sink 61 may be a part of gating signal generator 30 for providing a controllable current to charge or discharge each sensing capacitor. In another embodiment, the variable current source or sink may be a stand-along component of the assembly 3. For example, in order to compensate for an undesirably short gating duration for sensing region 14 due to the small capacitance of sensing capacitor 53, the controller 60 may control variable current source or sink 61 to provide a smaller current to charge and discharge the sensing capacitor 53. The decreased charging and discharging current ensures that it may take a longer time to charge and discharge sensing capacitor 53, thereby lengthening $T_{gate}$ associated with sensing region 14. Similarly, to compensate for the unnecessarily long $T_{gate}$ associated with sensing region 13, the controller 60 may control variable current source or sink 61 to provide a larger current to charge and discharge sensing capacitor 52. The increased charging and discharging current ensures that it may take a shorter time to charge and discharge the sensing capacitor 52, thereby shortening $T_{gate}$ associated with sensing region 13. By adjusting $T_{gate}$ associated with each sensing region or maintaining each $T_{gate}$ to a predetermined value, the series of gating signals may become a periodic or substantially periodic signal having a gating period equal to a substantially constant gating duration. At the same time, undesirable characteristics such as those illustrated in FIG. 6 may be avoided, resulting in a sensing assembly in which signal timing diagrams appear similar to that in FIGS. 4A, 4B and 4C, even if the capacitance varies between multiple sensing capacitors.

In other embodiments, instead of controlling variable current source or sink 61, controller 60 may control the pre-scaling factor M of pre-scalar 35 to control $T_{gate}$. However, since M is typically a power of 2 (i.e. $2^n$), it may not be possible to continuously varying M to precisely control $T_{gate}$.

In a similar embodiment where sensing capacitors are operatively coupled to (e.g. connected in parallel with) oscillating signal generator 20, the variable current source or sink may be a part of oscillating signal generator 20 instead. In this case, there may be a large variation in $T_{OSC}$ (not shown) which may be adjusted or substantially maintained by controller 60 by controlling the controllable current provided to charge or discharge the sensing capacitors. In other embodiments, regardless of whether the sensing capacitors are operatively coupled to oscillating signal generator 20 or the gating signal generator 30, the controller 60 may control the controllable current for charging or discharging the internal capacitors of both oscillating signal generator 20 and gating signal generator 30, thereby controlling both the $T_{OSC}$ and $T_{gate}$ to ensure that the ratio of $T_{gate}$ to $T_{OSC}$ is adjusted to or maintained at the predetermined value.

As may be appreciated by the skilled person, each sensing capacitor may require a different charging or discharging current to adjust or substantially maintain the ratio $T_{gate}$ to $T_{OSC}$ at a predetermined value or a predetermined range of values. According to a further aspect of the invention, there is provided a method of calibrating a proximity or touch sensing assembly. The calibration method may be used in multichannel sensors having sensing capacitors of different capacitance. The calibration method may be carried out by a calibration module 65 integral to the sensing assembly. In one form, the calibration module may ascertain, for each sensing region and its corresponding sensing capacitor, an optimal current for charging or discharging the particular sensing capacitor being calibrated. The optimal current may not necessarily be a single value and may be selected from a range of optimal currents. Furthermore, the optimal current for one channel may, depending on the capacitance of the sensing capacitor, be different from the optimal current for another channel.

For example, in the sensing assembly illustrated in FIG. 5 where sensing capacitors 51, 52, 53 are operatively coupled to (e.g. connected sequentially in parallel with gating signal generator 30, the calibration method may include determining an optimal current for providing an optimal gating duration $T_{gate}*$ over which an optimal number N* of oscillating periods may be obtained. N* may fall within a range of predetermined values defined by a maximum threshold value and a minimum threshold value. The maximum threshold value and the minimum threshold value may be predetermined and stored by the calibration module. Typical maximum threshold values may be between 100 and 1500, and typical minimum threshold values may be between 40 and 300.

Figure 7A:
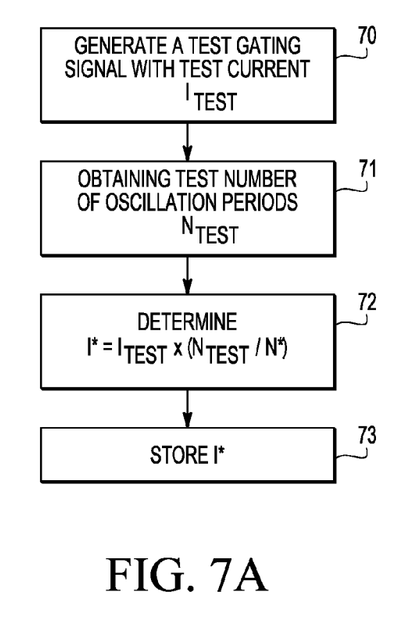
FIG. 7A is a flow chart illustrating a method of calibrating the first embodiment of the sensor.

Referring to FIG. 7A, at step 70, for each sensing region, a test gating signal of a test gating duration is generated. The test gating signal may be generated by providing a test current $T_{test}$ to charge or discharge the sensing capacitor being calibrated. At step 71, processing module 40 scans the sensing capacitor under calibration by obtaining a test number of oscillation periods $N_{test}$ over the test gating duration. At step 72, an optimal current I* is determined by $I*=I_{test}(N_{test}/N*)$. That is, the optimal current is obtained by multiplying the test current by the ratio of $N_{test}$ to N*. For example, if the corresponding test number of oscillation periods obtained at step 71 is twice the optimal number of oscillation periods predetermined by the calibration module (i.e. there are too many or more than sufficient oscillation cycles detected), the optimal current should be double the test current, to charge or discharge the sensing capacitor under calibration more quickly and to shorten the gating duration. The determined optimal current I* corresponds to the optimal gating duration $T_{gate}*$ over which the optimal number N* of oscillating periods is expected. At step 73, a value indicative of optimal gating duration $T_{gate}*$, such as the determined optimal current I*, is stored in a storage means, such as a memory 67, associated with the calibration module for later retrieval by controller 60 when actual scanning of the sensing region for touch detection takes place.

Figure 7B:
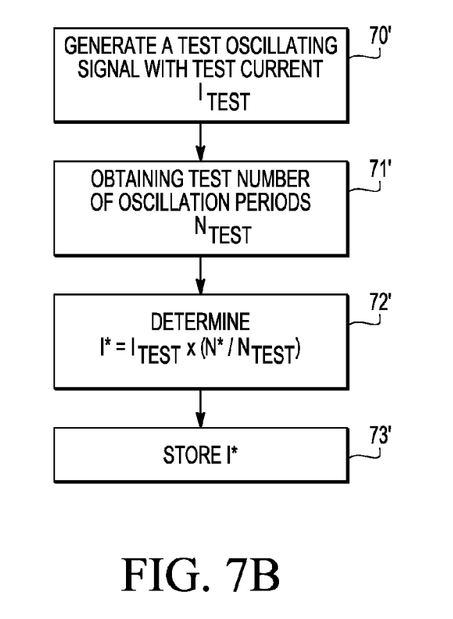
FIG. 7B is a flow chart illustrating a method of calibrating the second embodiment of the sensor.

In an embodiment where sensing capacitors 51, 52, 53 are operatively coupled to oscillating signal generator 20, the calibration method may include determining an optimal current for providing an optimal oscillation period $T_{OSC}*$ such that an optimal number N* of oscillating periods may be obtained. N* may fall within a range of predetermined values as described above. Referring to FIG. 7B, the steps 70'-73' of this embodiment are similar to steps 70-73 in the embodiment above, except that at step 70' a test oscillating signal having a test oscillating period (instead of a gating signal having a test gating duration) is generated with a test current $I_{test}$ charging or discharging the sensing capacitor under calibration. At step 71', processing module 40 is similarly set to scan the sensing capacitor under calibration to obtain a corresponding test number of oscillation periods $N_{test}$. At step 72', an optimal current I* is determined by $I*=I_{test}(N*/N_{test})$—which is a slightly different equation to the one above. For example, if the corresponding test number of oscillation periods obtained is twice the optimal number of oscillation periods predetermined by the calibration module (i.e. too many or more than sufficient oscillation cycles are detected), the optimal current should be half the test current, so as to charge or discharge the sensing capacitor under calibration more slowly to lengthen the oscillation period. The determined optimal current I* corresponds to the optimal oscillation period $T_{OSC}*$ such that the optimal number N* of oscillating periods over the gating duration is expected. At step 73', a value indicative of $T_{OSC}*$, such as the determined optimal current I*, is stored in storage means, such as a memory, of the calibration module for later retrieval by the controller when actual scanning of the sensing capacitor under calibration takes place.

Having described present preferred embodiment(s) for calibrating the sensing capacitors of a sensing assembly, operation of a calibrated sensing assembly to obtain sensing measurements at predetermined values will now be described. In a further aspect of the invention, there is provided a method of operating a sensing assembly calibrated by the calibration method illustrated in FIG. 7A. The method of operating may comprise the steps of, for each sensing region, (a) generating a gating signal having an optimal gating duration based on a stored value indicative of an optimal gating duration and (b) obtaining the number of oscillating periods over the optimal gating period.

In one embodiment, the stored value indicative of the optimal gating duration may include the stored optimal current required to generate a gating signal of the optimal gating duration. During operation of the calibrated sensing assembly, processing module 40 may proceed to scan a sensing region, and controller 60 may retrieve from the memory the stored optimal current for the particular sensing region. Controller 60 may then cause variable current source or sink 61 to provide the optimal current to charge or discharge the corresponding sensing capacitor, thereby generating a gating signal having an optimal duration for that particular sensing region. Processing module 40 may then obtain N during the gating duration and determine whether the particular sensing region is being touched by detecting a change in N from $N_{ref}$. This procedure may be repeated for each sensing region being scanned.

Alternatively, the sensing capacitors may be operatively coupled to the oscillating signal generator 20 instead of the gating signal generator 30. Therefore, according to a further aspect of the invention there is provided a method of operating a sensing assembly calibrated by the calibration method illustrated in FIG. 7B. The method of operating may comprise, for each sensing region, the steps of (a) generating an oscillating signal having the optimal oscillating period based on the stored value indicative of the optimal oscillating period and (b) obtaining the number of optimal oscillating periods over the gating duration associated with a respective one of the plurality of sensing regions.

Having described the various aspects and embodiments of the present invention, it should be apparent to a skilled person in the art that the present invention has the following advantages, inclusion of the controller permits control of the number of oscillation periods over a gating duration, to maintain the number N near a value that can be determined accurately or time-efficiently by a processing module. In a multi-channel capacitive sensor, the controller may allow multiple channels to share the same processing module having widely different capacitance without compromising accuracy or time-efficiency in obtaining a sensing measurement.

Those skilled in the art will appreciate that the invention described herein is susceptible to variations and modifications other than those specifically described. All variations and modifications are to be considered within the ambit of the present invention the nature of which is to be determined from the foregoing description.

The invention claimed is:

1. A sensor for sensing proximity or touch of an object, the sensor comprising:
    a sensing region;
    an oscillating signal generator for generating an oscillating signal having an oscillation period;
    a gating signal generator for generating a gating signal having a gating duration;
    a controller for controlling the oscillation period and/or the gating duration;
    a processing module for determining a number N of oscillation periods over the gating duration, the number N being indicative of the object's contact with, or proximity to, the sensing region;
    a sensing capacitor operatively coupled to the sensing region, wherein the controller controls a variable current source or sink for providing a controllable current to charge or discharge the sensing capacitor; and
    a pre-scalar operatively coupled to the gating signal generator, wherein the pre-scalar is controlled by the controller for increasing the gating duration.

2. The sensor of claim 1, wherein the oscillation period and/or the gating duration is based on the controllable current.

3. The sensor of claim 2, wherein the oscillation period and/or the gating duration is inversely proportional to the controllable current.

4. The sensor of claim 1, wherein the sensing capacitor has a capacitance changeable by the object's contact with, or proximity to, the sensing region.

5. The sensor of claim 4, wherein the oscillation period and/or the gating duration is based on the changeable capacitance of the sensing capacitor.

6. The sensor of claim 5, wherein the oscillation period or the gating duration is proportional to the changeable capacitance of the sensing capacitor.

7. The sensor of claim 1, wherein the processing module includes a counter for counting the number N of oscillation periods over the gating duration.

8. The sensor of claim 1, wherein the processing module detects a difference between a reference number of oscillation periods and the determined number N of oscillation periods over the gating duration.

9. The sensor of claim 8, wherein the processing module is adapted to determine the object's contact with, or proximity to, the sensing region based on the difference.

10. A sensor for sensing proximity or touch of an object, the sensor comprising:
    a plurality of sensing regions;
    an oscillating signal generator for generating a series of oscillating signals, each oscillating signal having an oscillation period associated with a respective one of the sensing regions;
    a gating signal generator, coupled to the sensing regions, for generating a series of gating signals, each gating signal having a gating duration associated with a respective one of the sensing regions;
    a controller, coupled to the oscillating signal generator and the gating signal generator, for controlling the oscillation period and/or the gating duration associated with each sensing region; and
    a processor, coupled to the oscillating signal generator and the gating signal generator, for determining, for each sensing region, a number N of oscillation periods over the gating duration associated with the respective sensing region, the number N being indicative of the object's contact with, or proximity to, the respective one sensing region.

11. The sensor of claim 10, wherein each sensing region is operatively coupled to a corresponding sensing capacitor and wherein the controller controls a variable current source or sink for providing a controllable current to charge or discharge each sensing capacitor.

12. The sensor of claim 11, wherein each sensing capacitor has a different static or parasitic capacitance.

13. The sensor of claim 10, further comprising a calibration module, coupled to the processor, for determining, for each sensing region, an optimal value for the oscillation period and/or the gating duration such that the number N falls within a range of predetermined values.

14. The sensor of claim 13, wherein the optimal value for the oscillation period and/or the gating duration includes an optimal current for charging or discharging the corresponding sensing capacitor.

15. The sensor of claim 13, wherein the calibration module includes a memory for storing, for each sensing region, the optimal value for the oscillation period and/or the gating duration.

* * * * *